US009373121B1

(12) United States Patent
Salge et al.

(10) Patent No.: US 9,373,121 B1
(45) Date of Patent: Jun. 21, 2016

(54) USER COMMUNICATION DEVICE CONTROL WITH OPERATING SYSTEM ACTION REQUEST MESSAGES

(75) Inventors: Jason M. Salge, Olathe, KS (US); M. Jeffrey Stone, Overland Park, KS (US); Robert L. Waldrop, Grandview, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 579 days.

(21) Appl. No.: 13/570,677

(22) Filed: Aug. 9, 2012

(51) Int. Cl.
*G06Q 30/00* (2012.01)
*G06Q 30/02* (2012.01)

(52) U.S. Cl.
CPC ............ *G06Q 30/02* (2013.01); *G06Q 30/0241* (2013.01); *G06Q 30/0277* (2013.01)

(58) Field of Classification Search
CPC .............. G06Q 30/02; G06Q 30/0277; G06Q 30/0241; G06Q 30/0273
See application file for complete search history.

(56) References Cited

U.S. PATENT DOCUMENTS

| | | | | |
|---|---|---|---|---|
| 6,336,142 B1* | 1/2002 | Kato et al. | ..................... | 709/227 |
| 7,471,947 B1* | 12/2008 | Papineau | ..................... | 455/418 |
| 8,122,236 B2* | 2/2012 | Hayward | .............. | G06Q 30/02 713/100 |
| 8,701,020 B1* | 4/2014 | Fulcher et al. | ................ | 715/756 |
| 8,713,425 B2* | 4/2014 | Reams | .................. | G06Q 30/02 715/234 |
| 8,837,466 B2* | 9/2014 | Altberg | .............. | G06Q 30/0241 370/356 |
| 8,934,614 B2* | 1/2015 | Altberg | ................. | G06Q 30/02 379/114.13 |
| 9,100,394 B2* | 8/2015 | Grochowicz | ....... | H04N 21/4622 |
| 2003/0028870 A1* | 2/2003 | Weisman et al. | ............ | 717/178 |
| 2006/0031493 A1* | 2/2006 | Cugi | ............................. | 709/225 |
| 2008/0134049 A1* | 6/2008 | Gupta et al. | .................. | 715/738 |
| 2008/0320328 A1* | 12/2008 | O'Leary | ......................... | 714/25 |
| 2009/0144068 A1* | 6/2009 | Altberg | ................. | G06Q 30/02 705/342 |
| 2011/0066741 A1* | 3/2011 | Hoefner et al. | ............... | 709/230 |
| 2011/0153728 A1 | 6/2011 | Einarsson et al. | | |
| 2012/0096455 A1* | 4/2012 | Katsumata et al. | ........... | 717/177 |
| 2012/0254407 A1* | 10/2012 | Li et al. | ......................... | 709/224 |
| 2012/0303961 A1* | 11/2012 | Kean et al. | .................... | 713/171 |
| 2014/0095406 A1* | 4/2014 | Wynn et al. | .................... | 705/347 |

OTHER PUBLICATIONS

Latif et al., Turning keywords into URIs: simplified user interfaces for exploring linked data, Nov. 2009, 6 pages.*
Petrie et al., Measuring user experience of websites: think aloud protocols and an emotion word prompt list, Apr. 2010, 6 pages.*

* cited by examiner

Primary Examiner — Thuy Dao

(57) ABSTRACT

In a communication system, a device control system determines an action request message for a software operating system in a user communication device and associates the action request message with a URI. A user communication device displays a prompt for the URI, receives a user input to prompt, and transfers a request for the URI responsive to the user input. The device control system receives the URI and responsively transfers display data indicating the action request message. The user communication device receives the display data, displays a user prompt, receives another user input, and processes the action request message in the software operating system responsive to the other user input.

17 Claims, 7 Drawing Sheets

USER COMMUNICATION DEVICE CONTROL WITH OPERATING SYSTEM ACTION REQUEST MESSAGES

TECHNICAL BACKGROUND

Communication devices, such as phones and computers, execute software operating systems and software applications to control operations and provide communication services. Some of the operating systems handle action request messages, where the applications send action request messages to the operating system, and the operating system forwards the action request messages to the appropriate applications. In some cases, the operating system selects the applications to receive the action request messages based on the message coding and the requested functionality. In other cases, the operating system selects the applications to receive the action request messages based on the message coding and application filters received from the applications. If the coding of an action request message passes a filter from a given application, then the operating system passes that action request message to that application. The receiving application executes the requested actions based on the message.

For example, an action request message may be embedded in a web page processed by a web browser application. The browser can derive the action request message from the web page and transfer the action request message to the operating system, and the operating system could forward the action request message to another application. Thus, the action request messaging service provided by the operating system acts as a message broker between various applications. Examples of action request messages include Android intent messages and Blackberry content handler messages.

Many user communication devices exhibit performance issues beyond the ability of the user to fix on their own. For example, a user's service identifier that is stored in their phone in a locked manner could become corrupted and prevent communication service registration for the user. The solution is to unlock the phone and overwrite the correct service identifier over the corrupted service identifier. Unfortunately, many service providers do not want to provide the secret unlock codes to the users. This scenario may force the user to travel to a phone store that has the code to repair their phone, or to send their phone away for re-configuration. There is not an effective and efficient technique for using action request messages to remotely reconfigure a phone with user consent.

TECHNICAL OVERVIEW

In a communication system, a device control system determines an action request message for a software operating system in a user communication device and associates the action request message with a URI. A user communication device displays a prompt for the URI, receives a user input to prompt, and transfers a request for the URI responsive to the user input. The device control system receives the URI and responsively transfers display data indicating the action request message. The user communication device receives the display data, displays a user prompt, receives another user input, and processes the action request message in the software operating system responsive to the other user input.

DETAILED DESCRIPTION

Figure 1:
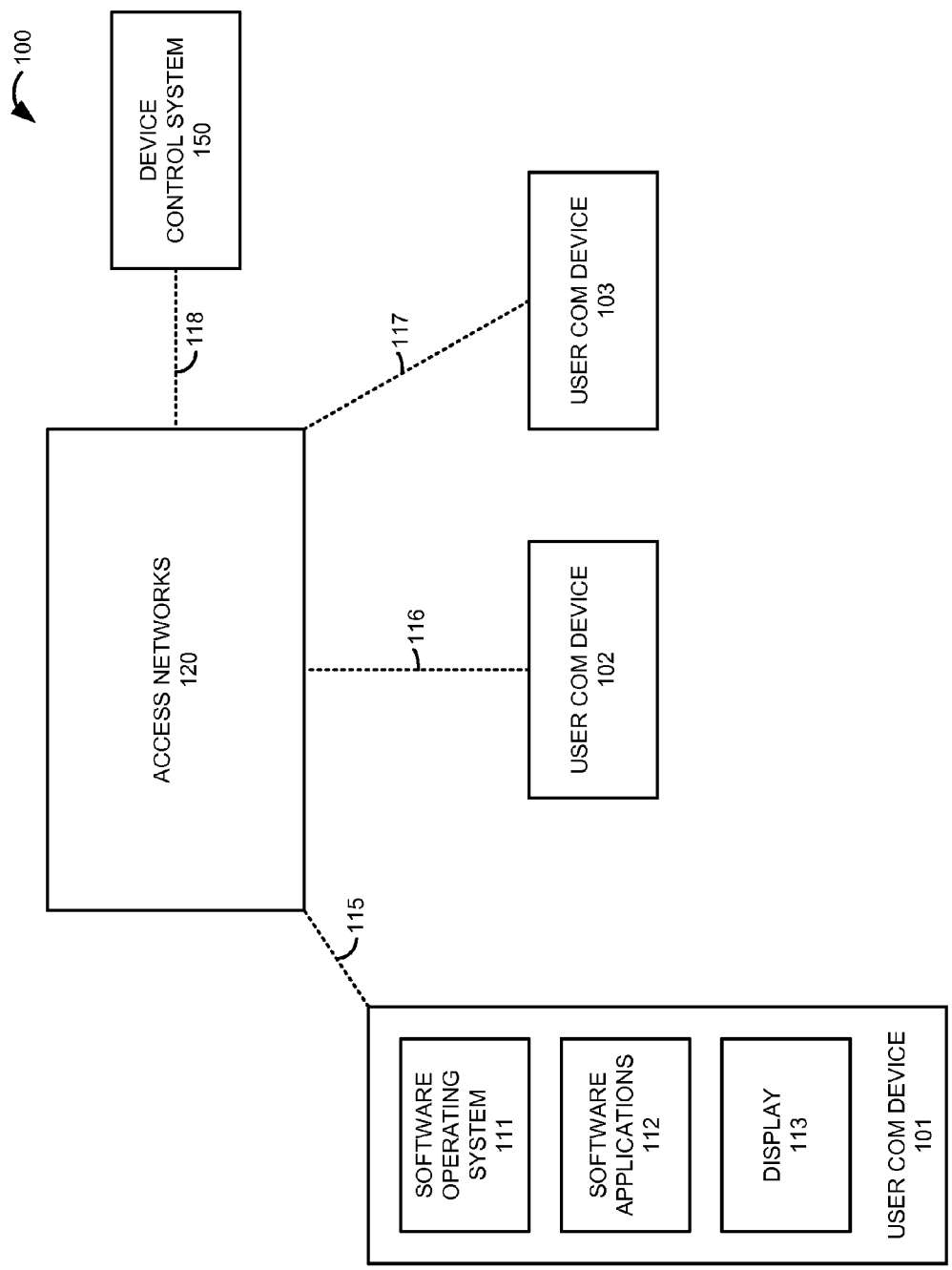
FIG. 1 illustrates a communication system to control communication devices with action request messages for the software operating systems in the communication devices.

FIG. 1 illustrates communication system 100 to control communication devices 101-103 with action request messages for the device software operating systems. Communication system 100 comprises user communication devices 101-103, access networks 120, and device control system 150. User communication devices 101-103 comprise phones, computers, media players, machine transceivers, or some other communication equipment that executes software operating systems and software applications. User communication device 101 includes software operating system 111, software applications 112, and display 113. User communication devices 102-103 would be configured in a similar manner to device 101.

In operation, device control system 150 determines an action request message for software operating system 111 in user communication device 101. Device control system 150 associates the action request message with a Uniform Resource Indicator (URI). Device control system 150 typically transfers the URI to user communication device 101—possibly through a text message or email—although device 101 may receive the URI through some other technique. In some examples, the action request message comprises an Android intent message, although other types of action request messages for other operating systems could be used.

User communication device 101 displays a user prompt for the URI and responsively receives a positive user input selecting the URI. Responsive to the positive user input, user communication device 101 transfers the URI for delivery to device control system 150. Device control system 150 receives the URI transferred by user communication device 101.

Device control system 150 translates the URI into display data for user communication device 101. The display data indicates the action request message previously associated with the URI. The display data may also include a description of the actions invoked by the action request message. Device control system 150 transfers the display data indicating the action request message for delivery to user communication device 101, and user communication device 101 receives the display data indicating the action request message. In some examples the display data comprises a Hyper-Text Mark-up Language (HTML) file, although other display data formats could be used.

User communication device 101 displays another user prompt responsive to the display data. Typically, the user prompt describes the action(s) invoked by the action request message and requests user approval. User communication device 101 receives another positive user input selecting the action(s) in response to the prompt. Responsive to a positive user input, user communication device 101 processes the action request message in the software operating system 111. Typically this comprises one of software applications 112 transferring the action request message to operating system 111, and operating system 111 transferring the action request message to one or more of applications 112 for further execution to implement the desired actions.

Some examples of the desired actions are given below, although other actions could also be performed in a like manner. Responsive to operating system 111 processing the action request message, user communication device 101 may execute one of software applications 112 to: unlock the device to configure a communication parameter, decrypt encrypted configuration data to configure the communication parameter, remotely access a configuration server to configure the communication parameter, delete user data, and/or perform a communication test.

User communication devices 102-103 would operate like user communication device 101, although devices 102-103 may use different operating systems and/or applications. For example, a user communication device might execute a Blackberry operating system and use content handlers as the action request messages described herein. In addition, user communication devices 101-103 may individually utilize multiple operating systems and virtual machine layers, and the control techniques described herein could be implemented within these operating system environments. Note that the use of URIs as described herein is exemplary, and that other forms of resource identification could be used instead of URIs.

Access networks 120 comprise computer and communications equipment that use Wireless Fidelity (WiFi), Long Term Evolution (LTE), Global System for Mobile Communications (GSM), Evolution Data Only (EVDO), Bluetooth, DOCSYS, T1, Ethernet, Internet Protocol (IP), or some other communication protocols—including combinations thereof. Note that multiple access networks 120 are typical, but not required. Device control system 150 comprises computer equipment and software that may be implemented in a single platform or may be distributed across multiple platforms. In some examples, device control system 150 comprises a group of geographically-distributed servers.

Access networks 120 and user communication devices 101-103 communicate over communication links 115-117. Access networks 120 and device control system 150 communicate over communication link 118. Thus, user communication devices 101-103 and device control system 150 communicate over networks 120 and links 115-118. Communication links 115-118 might be wireless, optical, metallic, or some other communication media—including combinations thereof. Communication links 115-118 may individually comprise multiple parallel connections that utilize different protocols and paths. Communication links 115-118 may also include various intermediate networks, systems, and devices.

Figure 2:
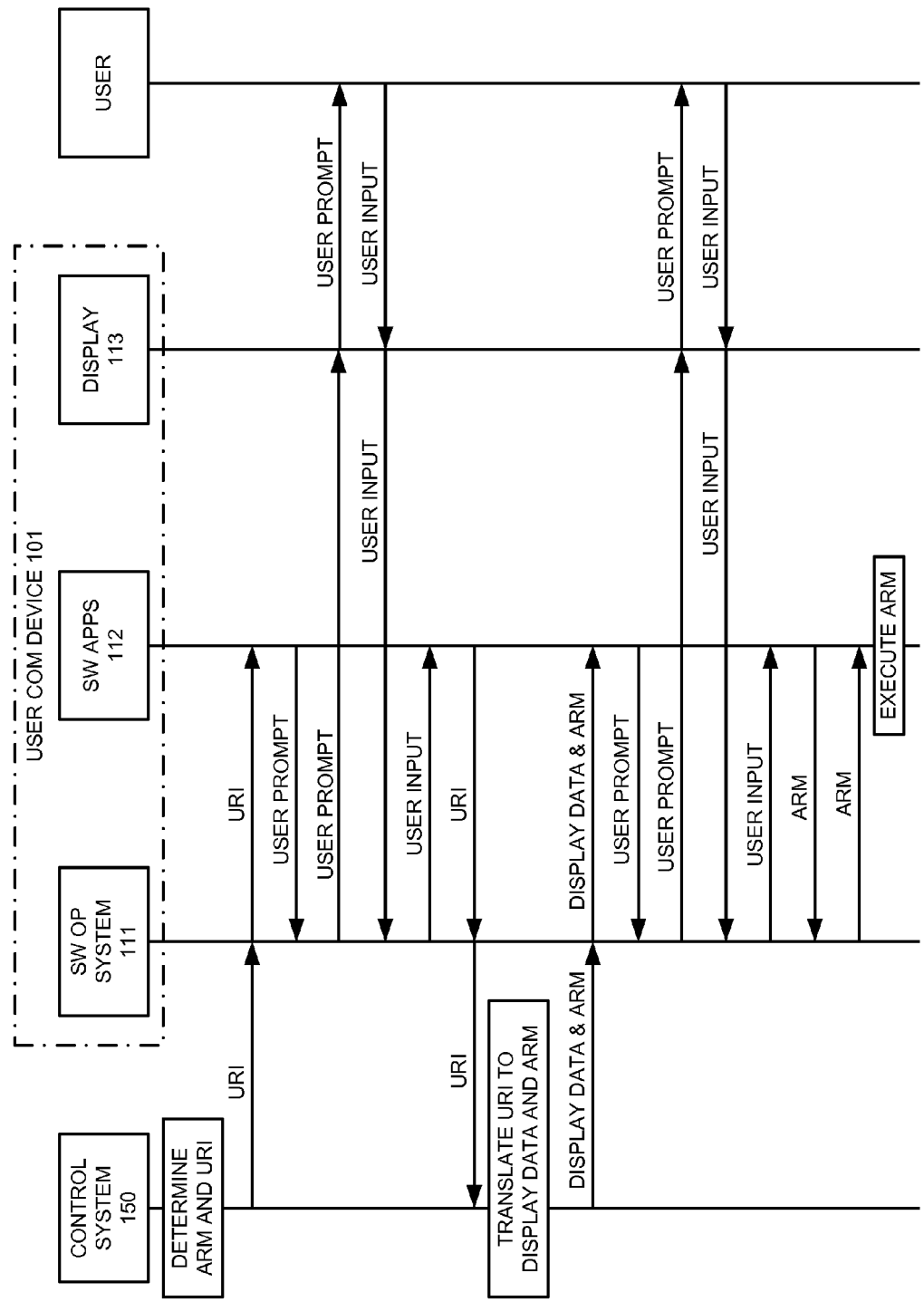
FIG. 2 illustrates the operation of the communication system to control communication devices with action request messages for software operating systems.

FIG. 2 illustrates the operation of communication system 100 to control communication device 101 with action request messages for software operating system 111. Device control system 150 selects an action request message (referred to as "ARM" on FIG. 2) for software operating system 111 and associates the action request message with a URI. An exemplary action request message might be to decrypt configuration parameters and use them to unlock and configure a user/account identifier in communication device 101. Device control system 150 transfers the URI to operating system 101, and operating system 101 transfers the URI to one of applications 112. For example, device control system 150 might send a text message including the URI to a text message application in user communication device 101. In another example, device control system 150 might send an email including the URI to an email application in user communication device 101. In yet another example, device control system 150 might send a social network message including the URI to a social network application in user communication device 101.

The one of applications 112 in device 101 that received the URI responsively transfers a prompt for the URI to operating system 111 for display 113, and display 113 presents the prompt to the user. For example, a text/email/social application might display the message with a link for the URI—and possibly with some helpful user information. In response to the prompt, the user provides a positive user input that selects the URI. For example, the user may select the displayed link with their finger on display 113. Display 113 reports the positive user input to operating system 111 which transfers the positive user input back to the application that invoked display 113. This application processes the positive user input to request the URI from operating system 111.

Operating system 111 transfers the URI for eventual delivery to device control system 150. Note that operating system 111 may use a browser in applications 112 to facilitate the URI request. Device control system 150 receives the URI transferred by user communication device 101. Device control system 150 translates the URI into display data, such as an HTML file, for user communication device 101. The display data includes the action request message previously associated with the URI and may also include helpful user information and prompts. Exemplary display data might comprise an HTML file with: user information explaining the actions to be taken, a user prompt to invoke the actions, and an embedded action request message to trigger the actions responsive to a user input to the prompt. Device control system 150 transfers the display data indicating the action request message for delivery to user communication device 101.

Operating system 111 in user communication device 101 receives the display data indicating the action request message. Operating system 111 transfers the display data to one of the applications in applications 112 and typically this application is a web browser although other applications could be used. The application processes the display data to transfer a user prompt to operating system 111 for display 113. Display 113 presents another user prompt based on the display data, and typically, the user prompt also describes the resulting actions being prompted. This prompt and response might comprise a check-box on a web page.

Display 113 receives another positive user input selecting the prompted actions and transfers the positive user input to operating system 111. Operating system 111 transfers the user input to the prompting application. Responsive to the positive user input, the application transfers the action request message indicated by the display data to operating system 111. For example, a browser application may transfer an Android intent message embedded in an HTML file to operating system 111.

Operating system 111 processes the action request message to identify the applications that are invoked by the action request message. Operating system 111 transfers the action request message to these identified applications to implement the desired actions. For example, the identified application could be a device configuration application that decrypts encrypted configuration data to unlock and configure device communication parameters. In some examples, the receiving applications pre-subscribe to receive particular types of action request messages. At least one of applications 112 will receive and execute the action request message from operating system 111. For example, a configuration application might use data from the action request message to configure a mobile service identifier in communication device 101.

Figure 3:
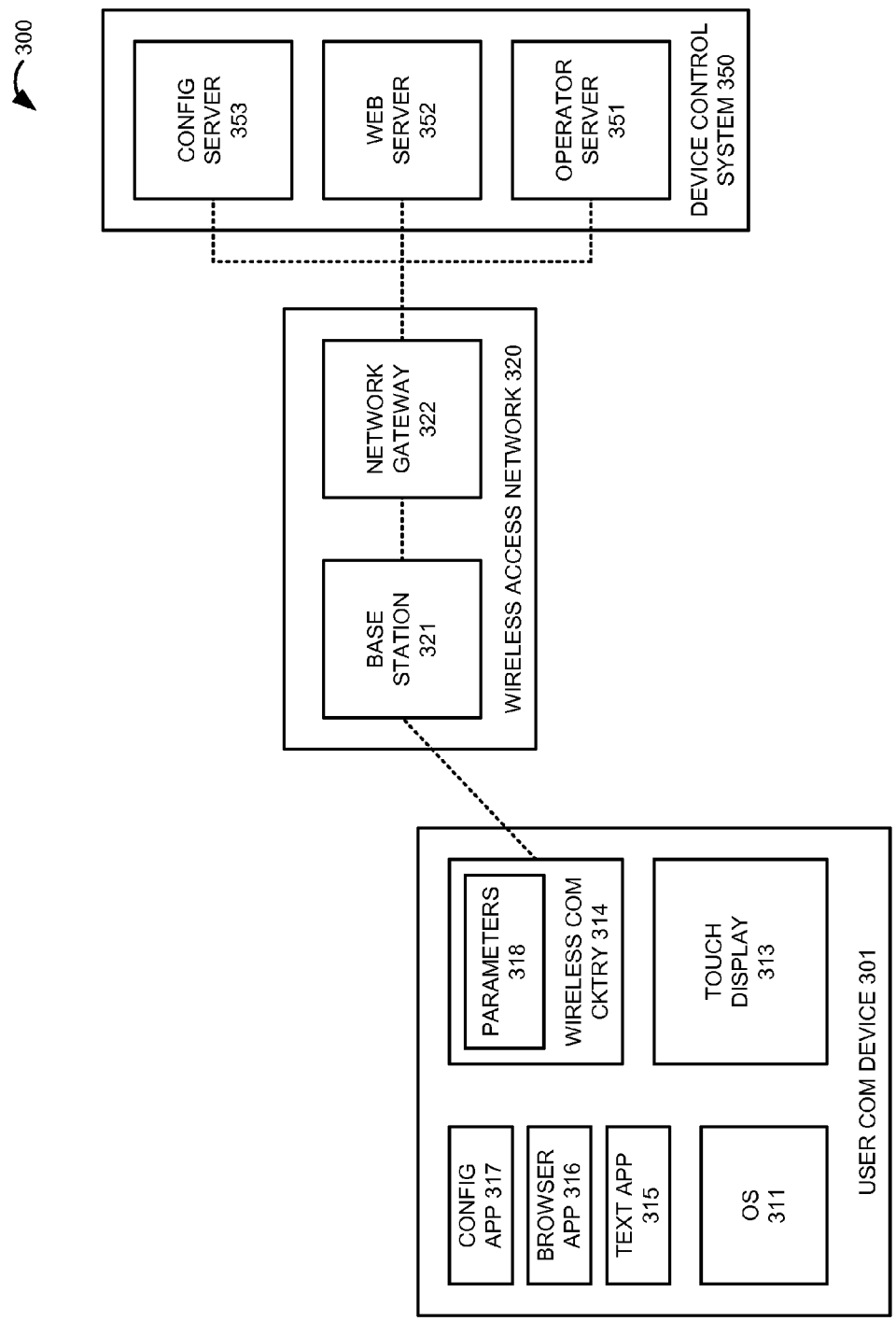
FIG. 3 illustrates a communication system to control communication devices with operating system intent messages.

FIG. 3 illustrates communication system 300 to control wireless communication device 301 with operating system intent messages. Communication system 300 comprises wireless communication device 301, wireless LTE network 320, and device control system 350. Wireless LTE network 320 comprises base station 321 and network gateway 322, and network 320 typically includes many more base stations, gateways, and other equipment that are omitted from the figure for clarity. Device control system 350 comprises operator server 351, web server 352, and configuration server 353.

Wireless communication device 301 might be a phone, computer, media player, machine transceiver, or some other user equipment that performs wireless data communication and that executes software operating systems and software applications. Wireless communication device 301 comprises software operating system 311, wireless communication circuitry 314, touch display 113, text software application 315, browser software application 316, and configuration software application 317. Software operating system 311 could be an Android-based system or some other system that handles the intent type of action request messages.

Wireless communication circuitry 314 stores parameters 318 that require a secret code to change. The secret code might be a decryption key, unlock code, or the like. Parameters 318 might identify users, devices, communication networks, service accounts, radio settings, device capabilities, quality-of-service, or something else.

Figure 4:
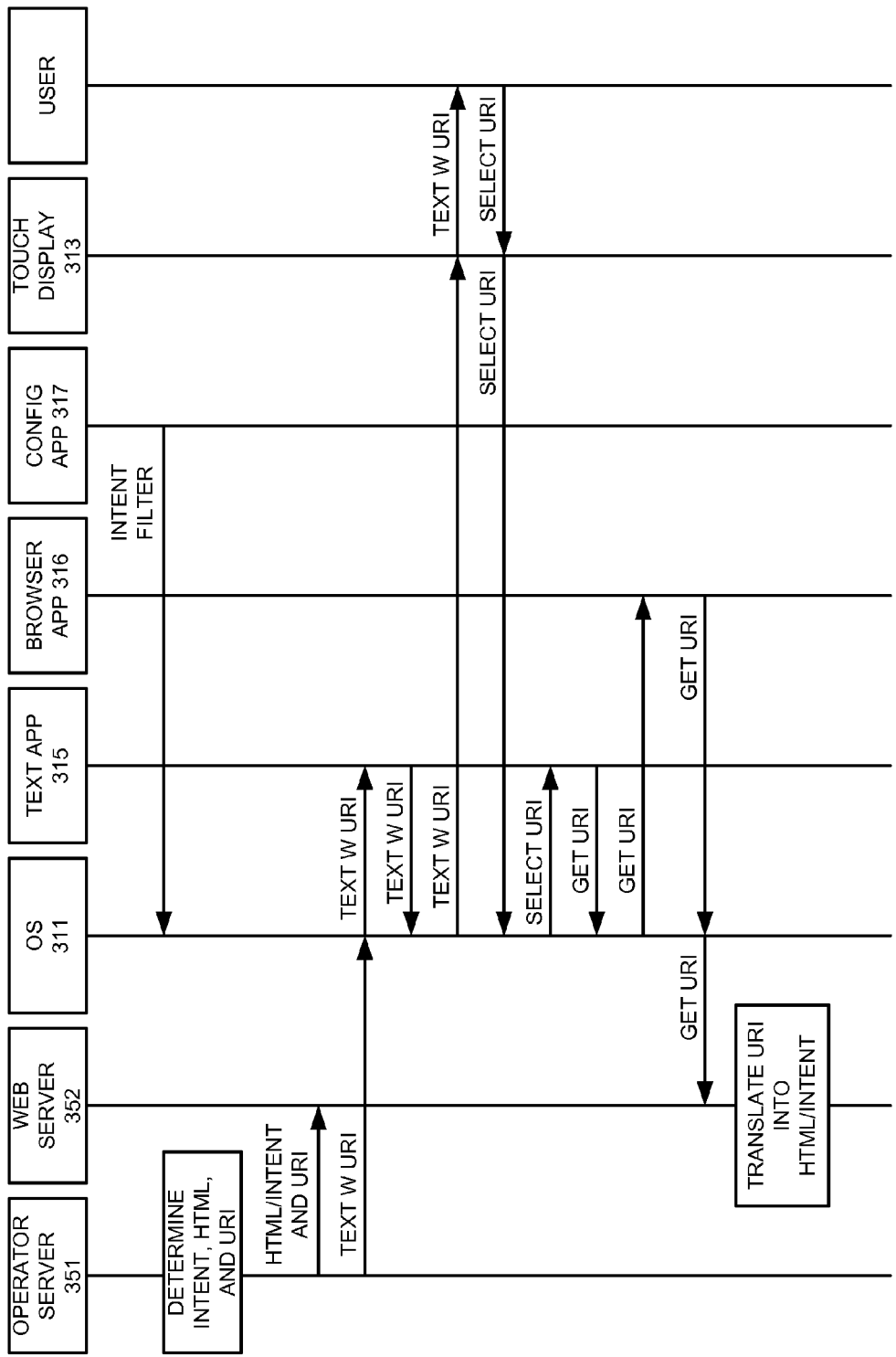
FIG. 4 illustrates the operation of the communication system to control communication devices with operating system intent messages.
Figure 5:
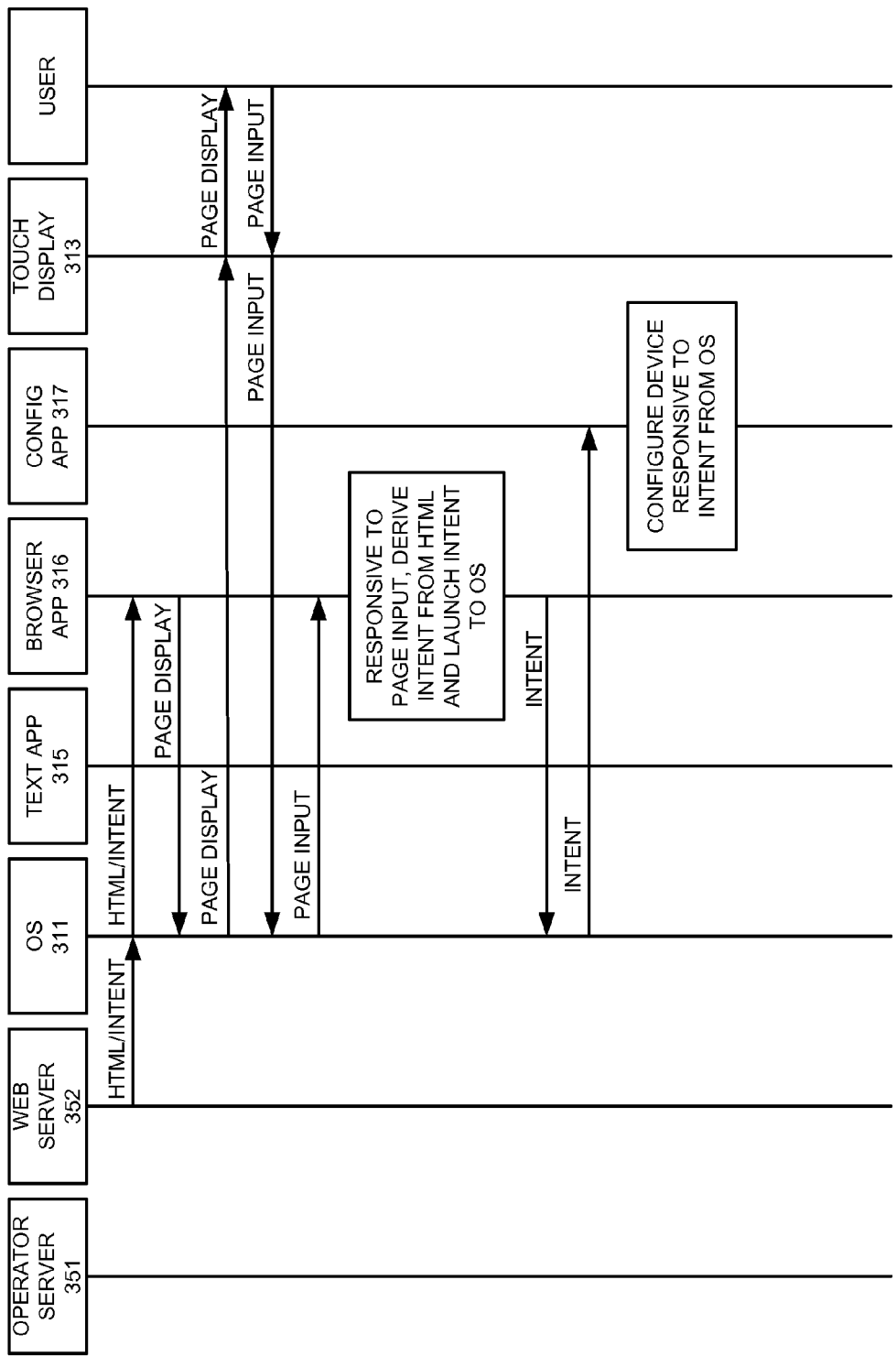
FIG. 5 illustrates the operation of the communication system to control communication devices with operating system intent messages.

FIGS. 4-5 illustrate the operation of communication system 300 to control wireless communication device 301 with operating system intent messages. Note that wireless communication circuitry 314 and LTE network 320 are omitted from FIG. 4 for clarity, but communications between user device 301 and control system 350 would typically traverse circuitry 314 and network 320.

Initially, configuration application 317 transfers one or more intent filters to operating system 311. The intent filters serve as subscriptions or requests for particular intent messages. Operator server 351 receives an operator selection of an action, such as the changing of parameters 318 in user communication device 318. Operator server 351 generates and/or retrieves an HTML file for the action that includes an embedded operating system intent to change parameters 318 in user communication device 301. This embedded intent message is appropriately addressed and coded so it will pass the intent filter in operating system 311 to reach configuration application 317. The intent includes an encrypted secret code and user service data to unlock and change parameters 318 in wireless communication circuitry 314.

Operator server 351 associates a URI with the HTML file and transfers the URI and HTML file to web server 352. Operator server 351 also transfers a text message with the URI and user instructions through operating system 311 to text application 315. Text application 315 presents the message with the URI and user instructions to the user through operating system 111 and touch display 313. The user selects the URI on touch display 313 responsive to the user instructions, and display 313 transfers the user input to text application 315 through operating system 311. In some examples, the user is in voice and/or video communication with operational personnel at device control system 350 who explains the text message.

Text application 315 requests the URI from operating system 311 which transfers the URI to browser application 316. Browser application 316 transfers the URI request to web server 352 through operating system 311. Web server 352 translates the URI into the HTML file with the embedded intent message.

Referring now to FIG. 5, web server 352 transfers the HTML file with the intent message through operating system 311 to browser application 316. Based on the HTML file, browser application 316 drives a web page display to the user through operating system 311 and touch display 313. Typically, the web page describes the action(s) invoked by the action request message and requests user approval. Touch display 313 receives a positive page input from the user approving the actions. In some examples, the user is in voice and/or video communication with operational personnel at device control system 350 who explains the web page message. Touch display 313 transfers the positive page input through operating system 311 to browser application 316. Responsive to the positive page input, browser application 316 transfers the intent message to operating system 311.

Operating system 311 processes the intent with intent filters to forward the intent to configuration application 317. Configuration application 317 processes the intent to: decrypt the secret code, unlock wireless circuitry 314 configuration with the secret code, and change parameters 318 in circuitry 314 to values indicated by the intent message. For example, the intent message might include an accurate user identifier to overwrite a corrupted user identifier in wireless communication circuitry 314. In some examples, configuration application 317 has decryption keys, filter generation modules, and logic to act on action request messages.

Figure 6:
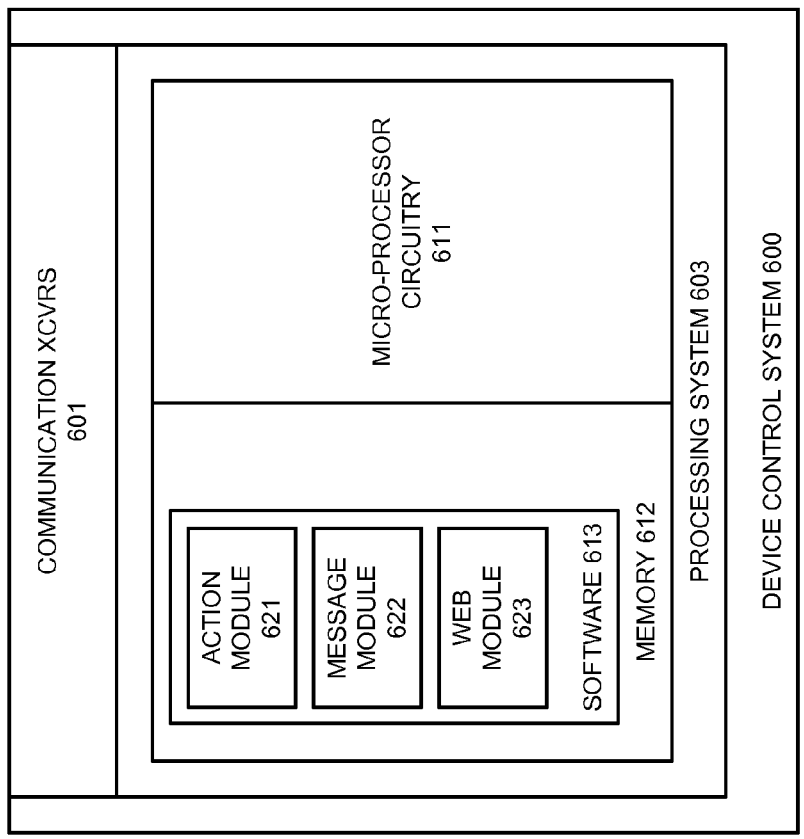
FIG. 6 illustrates a device control system to control communication devices with action request messages for the software operating systems in the communication devices.

FIG. 6 illustrates device control system 600 to control user communication devices with operating system action request messages. Device control system 600 is an example of the control systems 150 and 350 described herein, although these control systems may use alternative configurations and operations. Device control system 600 comprises communication transceivers 601 and processing system 603. Processing system 603 comprises micro-processing circuitry 611 and memory 612. Memory 612 stores software 613. Device control system 600 may be integrated into a single platform or may be distributed across multiple diverse computer and communication systems. Some conventional aspects of device control system 600 are omitted for clarity, such as power supplies, enclosures, and the like.

Communication transceivers 601 comprise communication components, such as ports, circuitry, memory, software, and the like. Communication transceivers 601 typically utilize Ethernet, Internet, or some other networking protocol—including combinations thereof.

Micro-processor circuitry 611 comprises circuit boards that hold integrated circuitry and associated electronics. Memory 612 comprises non-transitory, computer-readable, data storage media, such as flash drives, disc drives, and the like. Software 613 comprises computer-readable instructions that control the operation of micro-processor circuitry 611 when executed. Software 613 includes modules 621-623 and may also include operating systems, applications, utilities, databases, and the like. Micro-processor circuitry 611 and memory 612 may be integrated into a single computer system or may be distributed across multiple computer systems.

When executed by circuitry 611, action module 621 directs circuitry 611 to determine actions and their corresponding action request messages and URIs. When executed by circuitry 611, message module 622 directs circuitry 611 to transfer messages to user communication devices to indicate the URIs to the users. When executed by circuitry 611, web module 623 directs circuitry 611 to serve out the HTML files with their embedded action request messages responsive to associated URI requests from user devices.

Figure 7:
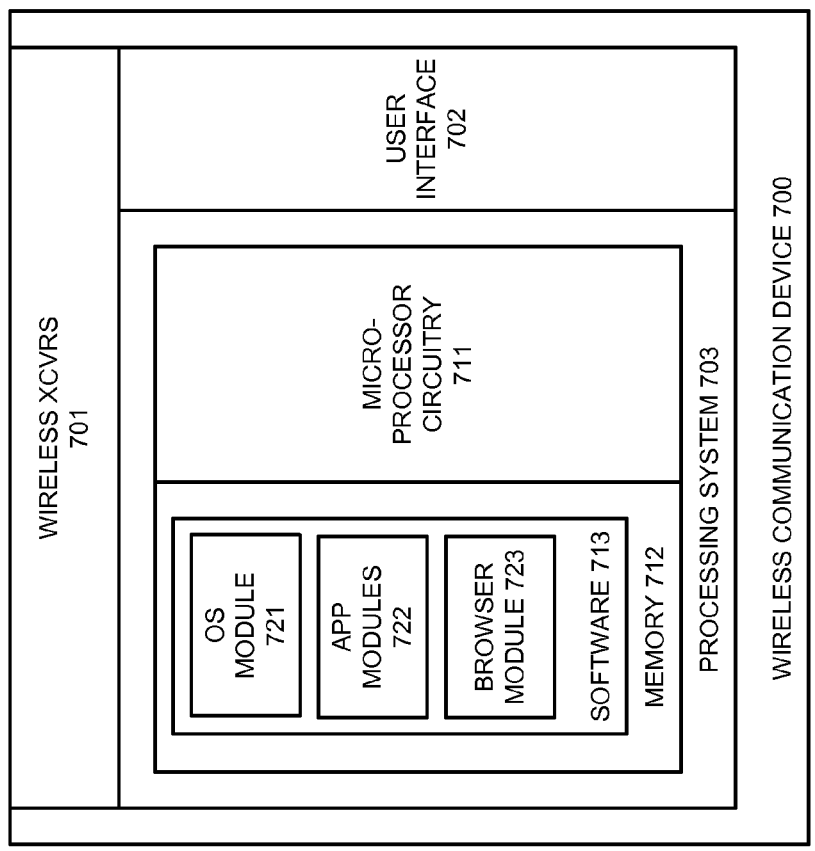
FIG. 7 illustrates a wireless communication device to provide user/system control based on operating system action request messages.

FIG. 7 illustrates wireless communication device 700 to provide user/system control based on operating system action request messages. Wireless communication device 700 is an example of user devices 101-103 and 301 described herein, although these user communication devices may use alternative configurations and operations. Wireless communication device 700 comprises communication transceivers 701, user interface 702, and processing system 703. Processing system 703 comprises micro-processing circuitry 711 and memory 712. Memory 712 stores software 713. Some conventional aspects of wireless communication device 700 are omitted for clarity, such as power supplies, enclosures, and the like. Wireless communication device 700 may be integrated into other systems or devices.

Wireless transceivers 701 comprise communication components, such as circuitry, memory, software, antennas, amplifiers, filters, modulators, signal processors, and the like. In some examples, the radio communications include multiple transceiver sub-systems for near-field, local network, and wide-area network data communications. Wireless transceivers 701 wirelessly exchange data indicating the messaging and URI retrieval described herein.

User interface 702 includes components to interact with a human operator, such as a touch display, speaker, microphone, camera, buttons, and switches. User interface 702 displays user prompts and receives user instructions that trigger the action request messages as described herein.

Micro-processor circuitry 711 comprises one or more circuit boards that hold integrated circuit chips and associated electronics. Memory 712 comprises non-transitory data storage media, such as flash drives, disc drives, and the like. Software 713 comprises computer-readable instructions that control the operation of micro-processor circuitry 711 when executed. Software 713 includes modules 721-723 and may also include additional operating systems, applications, utilities, databases, and the like.

When executed by circuitry 711, operating system module 721 directs circuitry 711 to process action request messages as described herein—in addition to other operating system tasks. When executed by circuitry 711, application modules 722 direct circuitry 711 to provide messaging and device configuration as described herein—in addition to other application tasks. When executed by circuitry 711, browser module 723 directs circuitry 711 to provide URI retrieval and HTML processing (including action request message launches) as described herein.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a communication system comprising:
   in a device control system, determining an action request message for a software operating system in a user communication device and associating the action request message with a Uniform Resource Indicator (URI);
   in the device control system, transferring the URI for receipt by the user communication device over an access network;
   in the user communication device, displaying a first user prompt for the URI, receiving a first user input to the first user prompt, and transferring the URI responsive to the first user input;
   in the device control system, receiving the URI transferred by the user communication device and responsively, transferring display data indicating the action request message for delivery to the user communication device;
   in the user communication device, receiving the display data and displaying a second user prompt responsive to the display data, receiving a second user input to the second user prompt, and processing the action request message in the software operating system in the user communication device responsive to the second user input; and
   in the user communication device and responsive to the software operating system processing the action request message, executing a software application to decrypt configuration data from the action request message and to configure a communication parameter in the user communication device using the decrypted configuration data.

2. The method of claim 1 wherein the action request message comprises an android intent message.

3. The method of claim 1 wherein the display data comprises a hypertext mark-up language file.

4. The method of claim 1 wherein transferring the URI for receipt by the user communication device comprises transferring the URI for receipt by the user communication device in one of a text message and an email.

5. The method of claim 1 wherein executing the software application to decrypt the configuration data from the action request message and to configure the communication parameter in the user communication device using the decrypted configuration data comprises executing the software application to unlock the user communication device, decrypt the configuration data from the action request message, and configure the communication parameter in the user communication device using the decrypted configuration data.

6. The method of claim 1 wherein executing the software application to configure the communication parameter in the user communication device using the decrypted configuration data comprises executing the software application to remotely access a configuration server for communication devices.

7. The method of claim 1 wherein executing the software application to decrypt the configuration data from the action request message and to configure the communication parameter in the user communication device using the decrypted configuration data comprises executing the software application to delete user data, decrypt the configuration data from the action request message, and configure the communication parameter in the user communication device using the decrypted configuration data.

8. The method of claim 1 wherein executing the software application to decrypt the configuration data from the action request message and to configure the communication parameter in the user communication device using the decrypted configuration data comprises executing the software application to decrypt the configuration data from the action request message, configure the communication parameter in the user communication device using the decrypted configuration data, and perform a communication test.

9. A communication system comprising:
a device control system having a processing system with processing circuitry configured to determine an action request message for a software operating system in a user communication device and to associate the action request message with a Uniform Resource Indicator (URI);
the user communication device having a second processing system with second processing circuitry configured to display a first user prompt for the URI, receive a first user input to the first user prompt, and transfer the URI over an access network to the device control system responsive to the first user input;
the device control system configured to receive the URI transferred by the user communication device and responsively transfer display data indicating the action request message for delivery to the user communication device;
the user communication device configured to receive the display data and display a second user prompt responsive to the display data, to receive a second user input to the second user prompt, and to process the action request message in the software operating system in the user communication device responsive to the second user input; and
the user communication device configured to, responsive to the software operating system processing the action request message, execute a software application to decrypt configuration data from the action request message and to configure a communication parameter in the user communication device using the decrypted configuration data.

10. The communication system of claim 9 wherein the action request message comprises an android intent message.

11. The communication system of claim 9 wherein the display data comprises a hypertext mark-up language file.

12. The communication system of claim 9 wherein the device control system is configured to transfer the URI for receipt by the user communication device.

13. The communication system of claim 9 wherein the device control system is configured to transfer the URI for receipt by the user communication device in one of a text message and an email.

14. The communication system of claim 9 wherein the user communication device configured to execute the software application to decrypt the configuration data from the action request message and to configure the communication parameter in the user communication device using the decrypted configuration data is configured to execute the software application to unlock the user communication device, decrypt the configuration data from the action request message, and configure the communication parameter in the user communication device using the decrypted configuration data.

15. The communication system of claim 9 wherein the user communication device configured to execute the software application to configure the communication parameter in the user communication device using the decrypted configuration data is configured to execute the software application to remotely access a configuration server for communication devices.

16. The communication system of claim 9 wherein the user communication device configured to execute the software application to decrypt the configuration data from the action request message and to configure the communication parameter in the user communication device using the decrypted configuration data is configured to execute the software application to delete user data, decrypt the configuration data from the action request message, and configure the communication parameter in the user communication device using the decrypted configuration data.

17. The communication system of claim 9 wherein the user communication device configured to execute the software application to decrypt the configuration data from the action request message and to configure the communication parameter in the user communication device using the decrypted configuration data is configured to execute the software application to execute the software application to decrypt the configuration data from the action request message, configure the communication parameter in the user communication device using the decrypted configuration data, and perform a communication test.

* * * * *